US012631897B2

(12) United States Patent
Qiao et al.

(10) Patent No.: US 12,631,897 B2
(45) Date of Patent: May 19, 2026

(54) NAKED-EYE THREE-DIMENSIONAL DISPLAY DEVICE

(71) Applicants: SVG TECH GROUP CO., LTD, Suzhou (CN); Soochow University, Suzhou (CN)

(72) Inventors: Wen Qiao, Suzhou (CN); Linsen Chen, Suzhou (CN); Jianyu Hua, Suzhou (CN); Jiacheng Shi, Suzhou (CN); Ruibin Li, Suzhou (CN); Zhen Zhou, Suzhou (CN); Minghui Luo, Suzhou (CN); Donglin Pu, Suzhou (CN); Pengfei Zhu, Suzhou (CN); Tangdong Cheng, Suzhou (CN)

(73) Assignees: SVG TECH GROUP CO., LTD, Suzhou (CN); Soochow University, Suzhou (CN)

( * ) Notice: Subject to any disclaimer, the term of this patent is extended or adjusted under 35 U.S.C. 154(b) by 364 days.

(21) Appl. No.: 18/039,257

(22) PCT Filed: Jan. 7, 2022

(86) PCT No.: PCT/CN2022/070754
   § 371 (c)(1),
   (2) Date: May 29, 2023

(87) PCT Pub. No.: WO2022/148437
   PCT Pub. Date: Jul. 14, 2022

(65) Prior Publication Data
   US 2025/0093679 A1      Mar. 20, 2025

(30) Foreign Application Priority Data
   Jan. 11, 2021    (CN) .......................... 202110031925.2

(51) Int. Cl.
   *G02B 30/36*            (2020.01)

(52) U.S. Cl.
   CPC .................................... *G02B 30/36* (2020.01)
(58) Field of Classification Search
   None
   See application file for complete search history.

(56) References Cited

U.S. PATENT DOCUMENTS

| | | | |
|---|---|---|---|
| 6,700,701 B1 * | 3/2004 | Son ........................ | G02B 5/045 359/462 |
| 7,551,353 B2 * | 6/2009 | Kim ....................... | G02B 30/30 359/462 |

(Continued)

FOREIGN PATENT DOCUMENTS

| | | |
|---|---|---|
| CN | 105629621 A | 6/2016 |
| CN | 206115049 U | 4/2017 |

(Continued)

OTHER PUBLICATIONS

"Notice of Reason for Refusal" received for Japanese Patent Application No. 2023535003, mailed on Mar. 26, 2024, pp. 10.

(Continued)

*Primary Examiner* — Jyotsna V Dabbi
(74) *Attorney, Agent, or Firm* — EcoTech Law Group, P.C.

(57) ABSTRACT

A naked-eye three-dimensional (3D) display device is provided. The naked-eye 3D display device comprises: a display component, comprising an array of display units; and a viewing angle regulator, comprising an array of microprism blocks. The microprism blocks are divided into a plurality of groups, and an angle combination of a first angle and a second angle of each of the microprism blocks is preset so that outgoing lights of the same group of microprism blocks converge into the same viewpoint, and outgoing lights of different groups of microprism blocks converge into different viewpoints. Hence, a plurality of different viewpoints are formed by setting angles of inclined surfaces of the micro- (Continued)

prism blocks, thereby seeing different 3D display effects from different viewing angles.

12 Claims, 8 Drawing Sheets

(56) References Cited

U.S. PATENT DOCUMENTS

| | | | | |
|---|---|---|---|---|
| 10,656,428 B2 * | 5/2020 | Wei | | G02B 27/126 |
| 2005/0111100 A1 * | 5/2005 | Mather | | H04N 13/359 |
| | | | | 359/464 |
| 2009/0180180 A1 | 7/2009 | Shimshi et al. | | |
| 2014/0176835 A1 * | 6/2014 | Hayashi | | G02F 1/133504 |
| | | | | 349/15 |
| 2019/0271851 A1 | 9/2019 | Mukhtarov et al. | | |
| 2020/0166767 A1 | 5/2020 | Qin et al. | | |
| 2022/0155500 A1 * | 5/2022 | Claypoole | | G02F 1/13 |

FOREIGN PATENT DOCUMENTS

| | | | | | |
|---|---|---|---|---|---|
| CN | 105959672 B | 12/2017 | | | |
| CN | 112799237 A | 5/2021 | | | |
| CN | 214751131 U | 11/2021 | | | |
| IN | 208818934 U | 5/2019 | | | |
| JP | 2000069504 A | 3/2000 | | | |
| JP | 200142258 A | 2/2001 | | | |
| JP | 2001042258 A | 2/2001 | | | |
| JP | 2006126721 A | 5/2006 | | | |
| JP | 2006184447 A | 7/2006 | | | |
| JP | 2012133128 A | 7/2012 | | | |
| JP | 2013501357 A | 1/2013 | | | |
| JP | 2015102613 A | 6/2015 | | | |
| JP | 2019502941 A | 1/2019 | | | |
| JP | 2019508729 A | 3/2019 | | | |
| TW | 448312 B | 8/2001 | | | |
| TW | 201344244 A | * | 11/2013 | | G02B 27/22 |

OTHER PUBLICATIONS

"Chinese Office Action" received for Chinese Patent Application No. 202011536267.4, mailed on Feb. 1, 2021, pp. 16.
"Chinese Office Action" received for Chinese Patent Application No. 202011536267.4, mailed on Apr. 25, 2021, pp. 17.
"Chinese Office Action" received for Chinese Patent Application No. 202011536267.4, mailed on Aug. 18, 2021, pp. 16.
"Notice of Reason for Refusal" received for Japanese Patent Application No. 2023535003, mailed on Sep. 17, 2024, pp. 16.
Notice of Second Review Opinion received for CN Patent Application No. 202110031925.2, issued on May 20, 2025, 10 Pages.
Supplementary Retrieval Report received for CN Patent Application No. 202110031925.2, May 14, 2025, 2 Pages.
Notice of Reason for Refusal received for Japanese Patent Application No. 2023-535003, Aug. 18, 2020, 8 Pages.
International Search Report and Written Opinion mailed on Jul. 14, 2022, for International Application No. PCT/CN2022/070754 filed on Jan. 7, 2022, 14 pages.
Chinese Office action received for Chinese Patent Application No. 202110031925.2, mailed on Dec. 3, 2024, pp. 10.
Japanese Office Action received for Japanese Patent Application No. 2023-535003, mailed on Feb. 18, 2025, pp. 17.
Office action received for Korean patent application No. 10-2023-7018512, mailed on May 31, 2023, pp. 15.

\* cited by examiner

NAKED-EYE THREE-DIMENSIONAL DISPLAY DEVICE

RELATED APPLICATION

This application is a National Stage Application of International Application No. PCT/CN2022/070754 filed on Jan. 7, 2022 which further claims priority from CN Patent Applications having Ser. No. 20/211,0031925.2 respectively filed on Jan. 11, 2021, which is incorporated herein by reference for all purpose.

BACKGROUND OF THE INVENTION

Field of the Invention

The present invention relates to the field of display technologies, and in particular, to a naked-eye three-dimensional (3D) display device.

Description of the Related Art

As one of the main sources of information for human being, vision is particularly important in daily life. Unlike natural scenes, current conventional display devices can only present two-dimensional images. Such plane information lacking depth information limits exploration and cognition of humans for the wide world to a certain extent. Studies show that almost 50% of the human brain is used for processing of visual information, and the presentation manner of two-dimensional images results in lower brain utilization. Naked-eye three-dimensional (3D) display is widely applicable to film and television, games, education, vehicle, aviation, medical treatment, and military matters. The military field is used as an example. Visualization of the 3D image is required in aspects such as machinery manufacturing, battlefield analysis, military commander, remote operation, and so on, which has huge impact on the improvement in the operating efficiency. Therefore, the 3D display is known as the "next generation display technology", and has become an important research field and one of the technologies that many display companies compete to study.

The mechanisms and methods for realizing the naked-eye 3D display based on parallax barrier, columnar lens array, spatio-temporal multiplexing, or integrated light field, and the like are all using an optical element with a periodic microstructure or nanostructure to perform phase regulation on the display light field, and projecting image information from different viewing angles to different viewing angles by using approximately parallel beams. Although the free stereo display technology has made great progress, the naked-eye 3D display technology has not successfully entered the panel display field. Display issues such as vertigo (vergence-accommodation conflict), image crosstalk/ghosting, and decreased resolution, and device structure issues such as ultra-thinness and light utilization need to be resolved urgently.

The methods using parallax barriers and micro-lenticular lens array are based on the parallax principle. The principle has been invented for more than 100 years, and domestic and foreign enterprises constantly exhibit prototypes through the naked-eye 3D display based on the parallax principle. However, since the image crosstalk may cause problems such as visual fatigue, the naked-eye 3D display is prevented from really entering the field of consumer electronics.

The Chinese patent CN 105959672 B discloses a naked-eye 3D display device based on an active light-emitting display technology, and proposes that a multi-view 3D image is formed by performing wavefront modulation on an incident image by using a directional phase plate comprising a nano-grating pixel structure. However, pixels of the phase plate need to fit perfectly with pixels of a display, which is difficult to process and achieve precise alignment. In addition, the lights modulated through nano-gratings converge into a viewpoint with −1-level light, which has a theoretical maximum diffraction efficiency of only 40% and low light utilization.

Therefore, it is necessary to provide an improved solution to overcome the above problems.

SUMMARY OF THE INVENTION

The present invention is intended to provide a naked-eye three-dimensional (3D) display device, which can realize different 3D display effects viewed at different viewing angles.

In order to achieve the objective of the present invention, according to an aspect of the present invention, the present invention provides a naked-eye 3D display device. The naked-eye 3D display device comprises: a display component; a viewing angle regulator comprising an array of microprism blocks, each of the microprism blocks comprising a first surface close to the display component and a second surface away from the display component, a light from the display component entering the microprism block through the first surface of the microprism block, and then being emitted from the microprism block through the second surface of the microprism block, the second surface of the microprism block forming a first angle with the first surface in a first direction, the second surface of the microprism block forming a second angle with the first surface in a second direction perpendicular to the first direction, an outgoing angle of the light being emitted from the second surface of the microprism block being related to the first angle and the second angle. The array of microprism blocks are divided into a plurality of groups, and an angle combination of the first angle and the second angle of each of the microprism blocks is preset so that the lights emitted from the same group of microprism blocks converge into the same viewpoint, and the lights emitted from different groups of microprism blocks converge into different viewpoints.

Compared with the prior art, the microprism blocks of the present invention can project the light from the display unit to a specified direction according to the setting. In this way, the lights from the same group of display units are propagated through corresponding microprism blocks to converge into the same viewpoint, and the lights from different groups of display units are propagated through corresponding microprism blocks to converge into different viewpoints, thereby seeing different three-dimensional display effects viewed at different viewing angles.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF THE PREFERRED EMBODIMENTS

In order to further describe technical means and effects adopted in the present invention to achieve the intended purposes of the present invention, specific implementations, structures, features, and effects thereof according to the present invention are described in detail below with reference to the accompanying drawings and preferred embodiments.

In the present invention, an outgoing angle of a light emitted from each of microprism blocks may be controlled by setting an angle of an inclined surface of each of microprism blocks. Based on this principle, the lights from the same group of display units are propagated through corresponding microprism blocks to converge into the same viewpoint, and the lights from different groups of display units are propagated through corresponding microprism blocks to converge into different viewpoints, thereby seeing different three-dimensional (3D) display effects from different viewing angles.

First Embodiment

Figure 1:
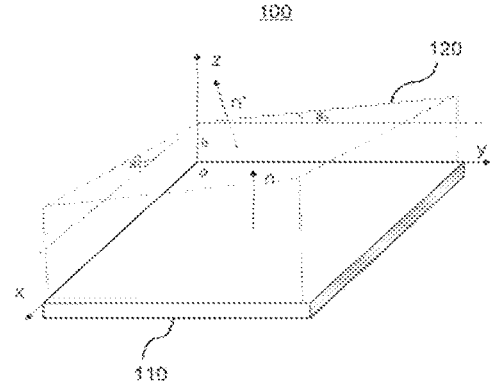
FIG. 1 is a schematic diagram of a stereostructure of a display assembly according to one embodiment of the present invention.
Figure 2:
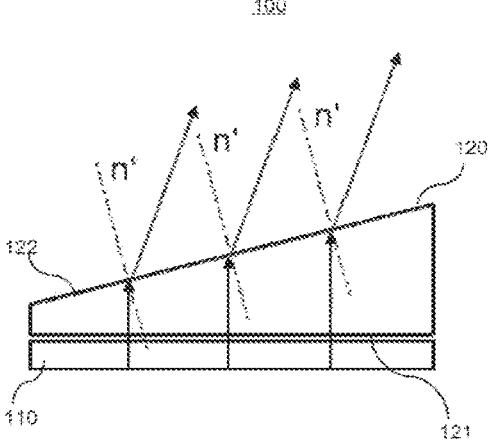
FIG. 2 is a schematic diagram of a side structure of the display assembly according to one embodiment of the present invention.

In a first embodiment, the present invention may provide a display assembly. The display assembly may be a display pixel or a display unit. FIG. 1 is a schematic diagram of a stereostructure of a display assembly according to one embodiment of the present invention. FIG. 2 is a schematic diagram of a side structure of the display assembly according to one embodiment of the present invention. As shown in FIG. 1 and FIG. 2, the display assembly 100 comprises a display unit 110 and a microprism block 120.

The microprism block 120 comprises a first surface 121 close to the display unit 110 and a second surface 122 away from the display unit 110. A light n from the display unit 110 enters the microprism block 120 through the first surface 121, and then is emitted from the microprism block 120 through the second surface 122. A first angle $\theta_1$ is formed between the second surface 122 and the first surface 121 in a first direction x, and a second angle $\theta_2$ is formed between the second surface and the first surface in a second direction y perpendicular to the first direction x. An outgoing angle of the light emitted from the second surface is related to the first angle $\theta_1$ and the second angle $\theta_2$. Specifically, the first angle and the second angle of the microprism block are set as a predetermined angle combination, so that the light emitted from the microprism block has a predetermined outgoing angle.

In FIG. 1 and FIG. 2, the first surface 121 of the microprism block is parallel to a displaying surface of the display unit 110, and the second surface 122 is an inclined surface relative to the first surface 121. In another embodiment, the microprism block may also be arranged upside down. That is to say, the second surface (the surface away from the display unit) of the microprism block is parallel to the displaying surface of the display unit, and the first surface (the surface close to the display unit) is an inclined surface relative to the second surface.

The microprism block controls the outgoing angle of the light emitted from the second surface through a refraction principle. As shown in FIG. 1, the outgoing angle of the light emitted from the second surface 122 may be defined by two parameters. One parameter is a direction of the outgoing light in a plane xoy and the other parameter is an angle of the outgoing light relative to the plane xoy. N times a wavelength of the outgoing light is less than a side length of the microprism block, wherein N is greater than or equal to 2. For example, a wavelength of a red light is in a range of 625 nm to 740 nm, and the side length of the microprism block may be more than 3.7 μm. In FIG. 1 and FIG. 2, an incident light of the microprism blocks, that is, the light emitted from the display unit 110, may be perpendicular to the first surface 121, or may not be perpendicular to the first surface 121.

In one embodiment, the display unit comprises one or more light-emitting pixels. The light-emitting pixel may be an LED pixel or an LCD pixel. In this case, the display unit may be one or more pixels in a display screen of an electronic product, and a content displayed by the LED pixel or the LCD pixel may be actively changed. In another embodiment, the display unit may also be one or more reflective pixels. The reflective pixel itself does not actively emit light, and a light projected externally to the reflective pixel is reflected by the reflective pixel. In this case, the display unit may be one or more pixels in a static picture. The display unit may also be referred to as a display pixel.

The principle of controlling the outgoing angle of the outgoing light by the microprism block is described in detail with reference to FIG. 1 to FIG. 5 below.

As shown in FIG. 1, a surface of the display unit is located in the plane xoy, and a normal direction n is parallel to an axis z. A lower surface of the microprism block (that is, the first surface) is parallel to the display unit, and a certain angle is formed between an upper surface (that is, the second surface) and the xoy plane, that is, the upper surface is an inclined surface. In another embodiment, the microprism block may also be reversed. That is to say, the upper surface of the microprism block is parallel to the display unit, and a certain angle is formed between the lower surface and the xoy plane. A first angle of an inclination angle formed by the inclined surface of the microprism block and the surface xoy on a plane xoz is $\theta_1$, and a second angle of an inclination angle formed by the surface xoy on a plane yoz is $\theta_2$. A normal direction of the inclined surface is set to n', and a vector height of a lowest point of the inclined surface is h. These five variables including inclined surface parameters ($\theta_1$, $\theta_2$, h) and a pixel position (x, y) of the microprism block can fully express the light field information, thereby realizing the control of the outgoing light. The vector height h of the lowest point of the inclined surface may be 0 or may not be 0, and the vector height h of the lowest point of the inclined surface does not affect the outgoing angle of the outgoing light.

A plane formed by the normal direction n of the plane where the display unit 110 is located and the normal direction n' of the inclined surface of the microprism block is shown in FIG. 2.

When a wavelength $\lambda$ of an incident light wave is much less than a size P of a single pixel (such as a side length of the microprism block) ($P \geq 2\lambda$), the outgoing direction follows the Snell's law:

$$n1 \sin \alpha = n2 \sin \beta$$

wherein n1 is a refractive index of an incident medium and is a refractive index of the microprism block in FIG. 2, n2 is a refractive index of an outgoing medium and is a refractive index of air in FIG. 2. $\alpha$ and $\beta$ are respectively an incident angle and an outgoing angle of the light on the second surface 122.

Therefore, an arbitrary angle of n' relative to the plane xoy within a hemisphere along a z-axis can be achieved by changing $\theta_1$ and $\theta_2$. That is to say, a surface formed by the normal direction n of the plane xoy and the normal direction n' of the inclined surface may be rotated one cycle with the normal direction n of the plane xoy as a center, and then the outgoing angle is regulated by using a formula of the Snell's law, so as to realize independent regulation of two angle variables ($\theta$, $\varphi$). Through regulation of the pixel position (x, y), independent regulation of at least four variables can be realized, thereby achieving the control of the outgoing light.

Figure 3:
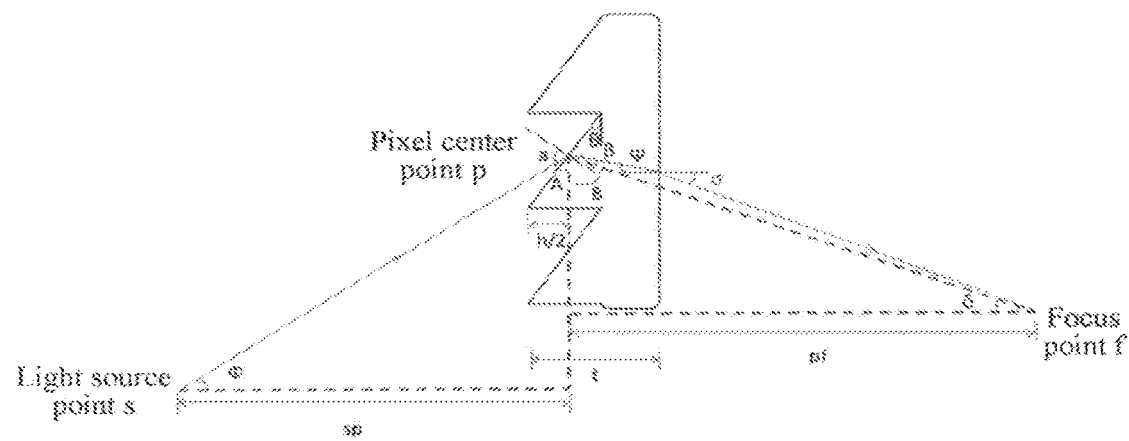
FIG. 3 is a two-dimensional schematic planar diagram of a light path of a light of a point light source.

In the naked-eye 3D display, as shown in FIG. 3, in order to converge lights emitted by a point light source to a specified convergence point, the first angle and the second angle of the microprism block corresponding to each display pixel need to be calculated to determine a surface shape of each display unit.

As shown in FIG. 3, a point light source is located at s (xs, ys, zs). An outgoing light of the point light source passes through a central point p (xp, yp, 0) of a structural surface (that is, the inclined surface of the microprism block), wherein p is set at a center of the microprism block and at a half height of the microprism block, and converged at a point f (xf, yf, zf) after refracted. It is assumed herein that a normal line of a plane formed by 3D coordinates s, p, and f is exactly perpendicular to the normal line of the structural surface. The structural surface is in the air, the refractive index of the whole structural surface is n, the refractive index of air is 1, a total thickness of a photoresist and a substrate is t, a structure height of the microprism block is h, and an angle of inclination of each small microprism block is $\theta$. $\phi$ and $\delta$ are the angles between the incident lights and the outgoing lights and the lines perpendicular to the structural surface, respectively. $\theta$ and $\beta$, $\Psi$ and $\sigma$ are respectively incident angles and refractive angles on both sides of an incident structural surface and a structural outgoing surface, and sp and fp are respectively vertical distances between a light source s and a focus point f and the structural surface.

Plane derivation is performed according to known conditions:

$$\tan \phi = \frac{sp \cdot \cos A}{sp \cdot \sin A} = \frac{1}{\tan A} = \frac{\cos A}{\sqrt{1 - \cos^2 A}}$$

$$\phi = \arctan \frac{\cos A}{\sqrt{1 - \cos^2 A}}$$

According to Snell's law, the structural incident surface is $$n \sin \beta = \sin a = \sin (\phi + \theta)$$

$$\beta = \arcsin \left[ \sin \left( \theta + \arctan \frac{\cos A}{\sqrt{1 - \cos^2 A}} \right) \cdot \frac{1}{n} \right]$$

$$\tan \delta = \frac{pf \cdot \cos B - \left( t - \frac{h}{2} \right) \tan \psi}{pf \cdot \sin B}$$

$$\delta = \arctan \frac{pf \cdot \cos B - \left( t - \frac{h}{2} \right) \tan \psi}{pf \cdot \sin B}$$

The outgoing surface is:

$$n \sin \psi = \sin \sigma = \sin \left( \arctan \frac{pf \cos B - \left( t - \frac{h}{2} \right) \tan \psi}{pf \cdot \sin B} \right) \tag{1}$$

$$\because \theta = \beta + \psi$$

$$\therefore \theta - \psi = \beta = \arcsin \left[ \sin \left( \theta + \arctan \frac{\cos A}{\sqrt{1 - \cos^2 A}} \right) \cdot \frac{1}{n} \right] \tag{2}$$

$$\therefore \text{Substitutte (2) into (1)}$$

$$n \sin \left[ \theta - \arcsin \frac{\sin \left( \theta + \arctan \frac{\cos A}{\sqrt{1 - \cos^2 A}} \right)}{n} \right] =$$

$$\sin \left\{ \arctan \frac{pf \cos B - \left( t - \frac{h}{2} \right) \tan \left\{ \theta - \arcsin \left[ \frac{1}{n} \cdot \sin \left( \theta + \arctan \frac{\cos A}{\sqrt{1 - \cos^2 A}} \right) \right] \right\}}{pf \cdot \sqrt{1 - \cos^2 B}} \right\}$$

It can be seen from the above formula that the inclination angle $\theta$ of the microprism block can be obtained only by obtaining the refractive index n of the structural surface, angles A, B, and pf. The A, B, and pf may be all obtained through the point light sources s, the pixel position p, and the focus point f in a two-dimensional space.

In fact, the light source s (xs, ys, zs), the pixel point p (xp, yp, 0) of the structural surface, and the focus point f (xf, yf, zf) are in a 3D space. The normal line of the plane spf is not perpendicular to the normal line of the structural surface, and a certain angle is formed therebetween.

Herein, the plane spf is mapped to the two planes x0z and 0yz perpendicular to the structural surface xy0, which may be understood as phase modulation of the incident light on the x-axis and phase modulation on the y-axis by an inclined surface of a frustum of a prism.

7

Figure 4:
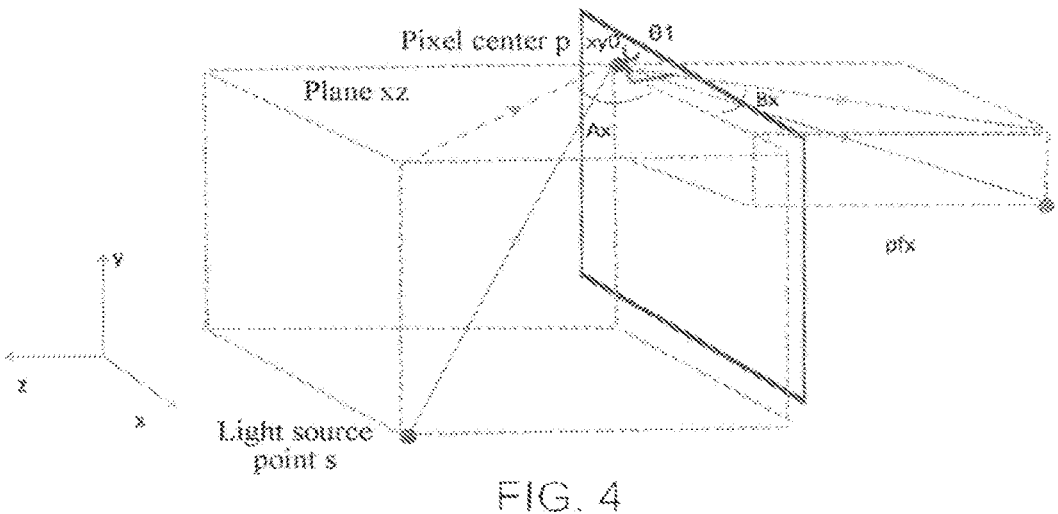
FIG. 4 is a schematic principle diagram of a light path of mapping of a plane spf to a plane xoz.

As shown in FIG. 4, it may be obtained as follows:

$$n \sin\left[\theta1 - \arcsin\frac{\sin\left(\theta1 + \arctan\dfrac{\cos Ax}{\sqrt{1 - \cos^2 Ax}}\right)}{n}\right] =$$

$$\sin\left\{\arctan\frac{pfx \cos Bx - \left(t - \dfrac{h}{2}\right)\tan\left\{\theta1 - \arcsin\left[\dfrac{1}{n} \cdot \sin\left(\theta1 + \arctan\dfrac{\cos Ax}{\sqrt{1 - \cos^2 Ax}}\right)\right]\right\}}{pfx \cdot \sqrt{1 - \cos^2 Bx}}\right\}.$$

The inclination angle $\theta_1$ (that is, the first angle) of the inclination angle, on the plane xoz, formed by the inclined surface of the microprism block and the surface xoy may be obtained by solving the above implicit function.

Figure 5:
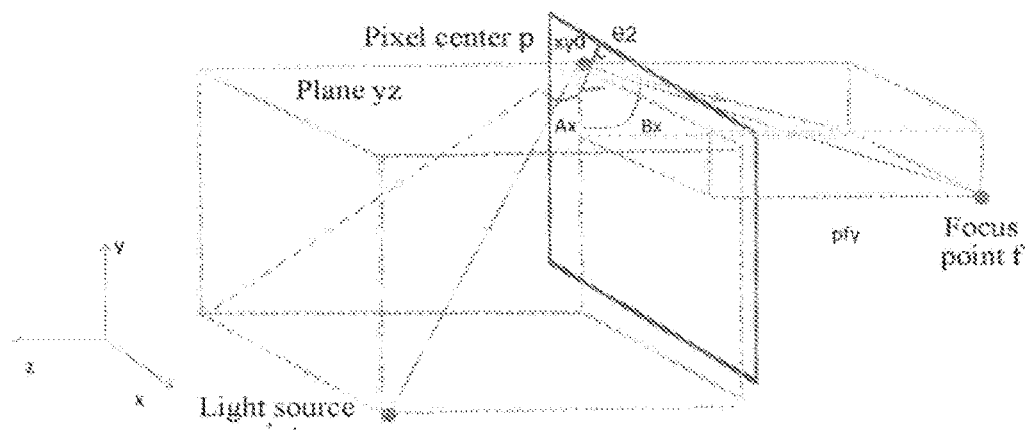
FIG. 5 is a schematic principle diagram of a light path of mapping of a plane spf to a plane yoz.

As shown in FIG. 5, it may be obtained as follows:

$$n \sin\left[\theta2 - \arcsin\frac{\sin\left(\theta2 + \arctan\dfrac{\cos Ay}{\sqrt{1 - \cos^2 Ay}}\right)}{n}\right] =$$

$$\sin\left\{\arctan\frac{pfy \cos By - \left(t - \dfrac{h}{2}\right)\tan\left\{\theta2 - \arcsin\left[\dfrac{1}{n} \cdot \sin\left(\theta2 + \arctan\dfrac{\cos Ay}{\sqrt{1 - \cos^2 Ay}}\right)\right]\right\}}{pfy \cdot \sqrt{1 - \cos^2 By}}\right\}.$$

The inclination angle $\theta_2$ (that is, the second angle) of the inclination angle, on the plane yoz, formed by the inclined surface of the microprism block and the inclination angle on the surface xoy may be obtained by solving the above implicit function.

When the light source is light emitted by a flat display such as an LCD and an LED, incident light may be approximately regarded as parallel incident light, and angles Ax and Ay are both 90°. The formulas may be as follows:

$$n \sin\left[\theta1 - \arcsin\frac{\sin(\theta1)}{n}\right] =$$

$$\sin\left\{\arctan\frac{pfx \cos Bx - \left(t - \dfrac{h}{2}\right)\tan\left\{\theta1 - \arcsin\left[\dfrac{1}{n} \cdot \sin(\theta1)\right]\right\}}{pfx \cdot \sqrt{1 - \cos^2 Bx}}\right\}$$

$$n \sin\left[\theta2 - \arcsin\frac{\sin(\theta2)}{n}\right] =$$

$$\sin\left\{\arctan\frac{pfy \cos By - \left(t - \dfrac{h}{2}\right)\tan\left\{\theta2 - \arcsin\left[\dfrac{1}{n} \cdot \sin(\theta2)\right]\right\}}{pfy \cdot \sqrt{1 - \cos^2 By}}\right\}.$$

Second Embodiment

Figure 6:
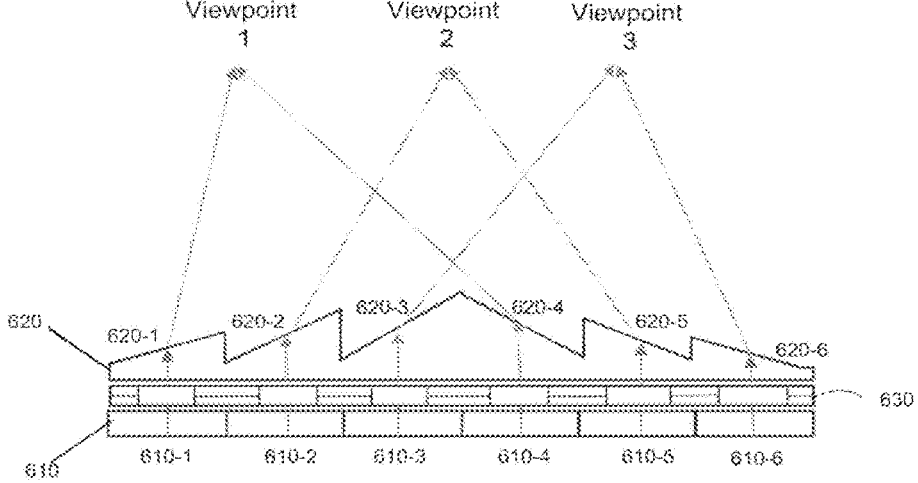
FIG. 6 is a schematic structural diagram of a naked-eye three-dimensional (3D) display device according to one embodiment of the present invention.

In the second embodiment, the present invention may provide a naked-eye 3D display device. FIG. 6 is a schematic structural diagram of a naked-eye 3D display device according to one embodiment of the present invention. As shown in FIG. 6, the naked-eye 3D display device 600 comprises a display component 610 and a viewing angle regulator 620.

The display component 610 comprises an array of display units. The display component 610 may be a display such as an LED and an LCD. In this case, the display emits light, and human eyes can see lights emitted by the display. In this case, each display unit of the display component 610 is a light-emitting pixel. In another embodiment, the display component 610 may also be a static picture. The static picture does not actively emit light and can be seen through reflected lights. In this case, each display unit is a reflective pixel rather than the light-emitting pixel.

In FIG. 6, only six display units are given by way of example, which are respectively 610-1 to 610-6. It is obvious that hundreds or thousands of or more display units may be arranged. The viewing angle regulator 620 comprises an array of microprism blocks. In FIG. 6, only six microprism blocks are given by way of example, which are respectively 620-1 to 620-6. It is obvious that hundreds or thousands of or more microprism blocks may be arranged. Each of the microprism blocks and a corresponding display unit may form the display assembly 100 described in the first embodiment. For details of each microprism block, each display unit, and how the microprism block and the display unit cooperate with each other, reference may be made to the description of the display assembly 100. The repeated content of this part is not described herein again.

Each display unit may be referred to as 1 pixel. From another perspective, a combination of each display unit and the corresponding microprism block may also be referred to as 1 pixel.

As shown in FIG. 6, first surfaces (surfaces close to the display component) of the microprism blocks 620-1 to 620-6 are planes, the second surface is the inclined surface relative to the first surface, and the first surfaces of the microprism blocks 620-1 to 620-6 are coplanar. As described above, in another embodiment, the viewing angle regulator 620 may also be turned over, that is to say, the inclined surface faces the display unit. In this case, the second surface of the microprism block (the surface away from the display component) is a plane, the first surface (the surface close to the display component) is the inclined surface relative to the second surface, and the second surfaces of the microprism blocks are coplanar.

The array of microprism blocks are divided into a plurality of groups, and an angle combination of the first angle and the second angle of each of the microprism blocks is preset so that outgoing lights of the same group of microprism blocks converge into the same viewpoint, and outgoing lights of different groups of microprism blocks converge into different viewpoints. As shown in FIG. 6, the microprism blocks are divided into three groups. The microprism blocks 620-1 and 620-4 form a first group, and the outgoing lights from the first group converge into a viewpoint 1. The microprism blocks 620-2 and 620-5 form a second group, and the outgoing lights from the second group converge into a viewpoint 2. The microprism blocks 620-3 and 620-6 form a third group, and the outgoing lights from the second group converge into a viewpoint 3. In practical use, the microprism blocks may be divided into at least 3 groups, for example, may be hundreds or thousands of groups. More groups of microprism blocks indicate more independent viewpoints. Each group of microprism blocks may also include hundreds or thousands of or more microprism blocks. The array of display units is configured to simultaneously display a plurality of images with different viewing angles. The display units corresponding to each group of microprism blocks display an image of one viewing angle, and the display units corresponding to different groups of microprism blocks display images of different viewing angles. Since the viewpoint in the present invention is converged by the outgoing lights, the viewpoint has high clarity and no crosstalk, and is not easy to cause vertigo of an observer. The microprism block in the present invention controls the outgoing direction of the lights through the refraction principle, which has high light utilization compared with the manner of modulating light through nano-grating in the prior art.

More specifically, the first angle and the second angle of each of the microprism blocks are set as a predetermined angle combination, so that the light emitted from each of the microprism blocks has a predetermined outgoing angle, the outgoing lights of the same group of microprism blocks converge into the same viewpoint, and the outgoing lights of different groups of microprism blocks converge into different viewpoints.

Viewed from one viewpoint, an image of one viewing angle displayed by the display units corresponding to one group of microprism blocks corresponding to the viewpoint may be seen. Observed from different viewpoints, images of different viewing angles displayed by the display units corresponding to different groups of microprism blocks may be seen. For example, viewed from the viewpoint 1 of FIG. 6, images of a first viewing angle displayed by the display units 610-1 and 610-4 may be seen. Viewed from the viewpoint 2 of FIG. 6, images of a second viewing angle displayed by the display units 610-2 and 610-5 may be seen. Viewed from the viewpoint 3 of FIG. 6, images of a third viewing angle displayed by the display units 610-3 and 610-6 may be seen.

Since a certain spacing exists between two human eyes, the human eyes are located at two different viewpoints. In this way, the user can see a 3D image with naked eyes. As the user moves, human eyes are also always located at two different viewpoints. For example, as shown in FIG. 6, a right eye of the user is located at the viewpoint 1 and a left eye is located at the viewpoint 2, and a 3D image composed of an image of the first viewing angle and an image of the second viewing angle (two images have a difference in the viewing angles) is seen. After the user moves to the left, the right eye of the user is located at the viewpoint 2 and the left eye is located at the viewpoint 3, and a 3D image composed of the image of the second viewing angle and an image of the third viewing angle is seen. As shown above, in fact, the naked-eye 3D display device in the present invention may have hundreds or thousands of viewpoints and can obtain continuous crosstalk-free parallax images to achieve fatigue-free naked-eye 3D display.

For the microprism block 620-1, since the predetermined convergence viewpoint is already determined, the incident direction of the light and the outgoing angle of the light are also determined. The first angle and the second angle of the inclined surface on the microprism block 620-1 may be obtained through calculation. Then the first angle and the second angle of the inclined surfaces of the microprism blocks 620-2 to 620-6 are calculated one by one. Finally, it may be obtained that the lights from the microprism blocks 620-1 and 620-4 are directed toward the viewpoint 1, the lights from the microprism blocks 620-2 and 620-5 are directed toward the viewpoint 2, and the lights from the microprism blocks 620-3 and 620-6 are directed toward the viewpoint 3.

Figures 7, 8:
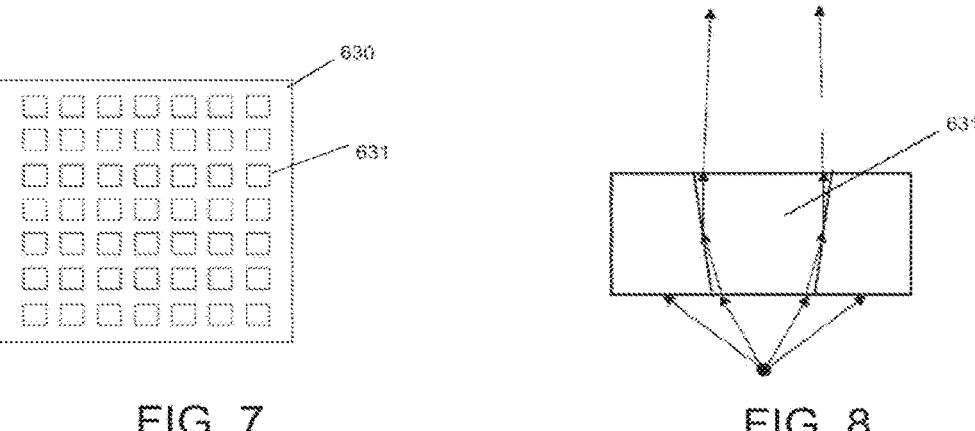
FIG. 7 is a top view of an aperture array diaphragm in FIG. 6.
FIG. 8 is a schematic diagram of a light propagation effect of an aperture of the aperture array diaphragm in FIG. 6.

As shown in FIG. 6, the naked-eye 3D display device further comprises an aperture array diaphragm 630 located between the display component 610 and the viewing angle regulator 620. The aperture array diaphragm 630 comprises apertures arranged in an array. Each aperture corresponds to a display unit, and a light emitted from the display unit is propagated to the corresponding microprism block through the corresponding aperture. The aperture array diaphragm 630 may collimate outgoing lights of the display component 610. FIG. 7 is a top view of an aperture array diaphragm in FIG. 6. As shown in FIG. 7, an aperture 631 is a square column. In other embodiments, the aperture may also be a round column or a polygonal column. FIG. 8 is a schematic diagram of a light propagation effect of an aperture of the aperture array diaphragm in FIG. 6. In FIG. 8, a diameter of a side of the aperture 631 facing the display unit is less than a diameter of a side of the aperture 631 facing the microprism block, so as to improve the ray shaping effect. In other embodiments, the diameters of the apertures may also be consistent.

Figure 9:
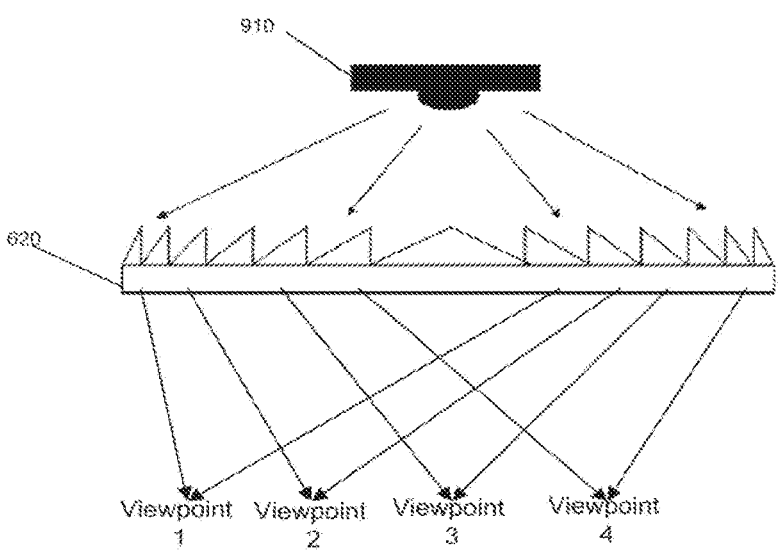
FIG. 9 is a schematic structural diagram of a naked-eye 3D display device according to another embodiment of the present invention.

FIG. 9 is a schematic structural diagram of a naked-eye 3D display device according to another embodiment of the present invention. As shown in FIG. 9, the naked-eye 3D display device comprises a display component 910 and a viewing angle regulator 620. A structure and principle of the viewing angle regulator 620 are the same as those of the viewing angle regulator 620 in FIG. 6.

The display component 910 used in the naked-eye 3D display device in FIG. 9 is not a parallel light source such as the array of display units in FIG. 6 like the LED display, or the LCD display, but a point light source such as a projection display unit.

A position of the projection display unit may be regarded as a point light source s (xs, ys, zs). A pixel array projected by the projection display unit corresponds to each microprism block on the viewing angle regulator 620. The viewing angle regulator 620 is lined with microprism blocks (also referred to as structural pixels) p (xp, yp, 0) that modulate outgoing directions of lights according to angles of incident light. The lights are converged to a position of f (xf, yf, zf) of the designed viewpoint through the microprism block of each pixel, and the fixed vector height h as the inclined surface parameter of the microprism block is set. The inclined surface parameters $\theta_1$ and $\theta_2$ of each microprism block structure may be derived according to basic formulas of the point light source, the pixel, the viewpoint position, and a free angle. The observer sees different viewpoints with eyes, and the different viewpoints correspond to the corresponding two images with parallax. In this way, the 3D effect is produced.

Figure 10:
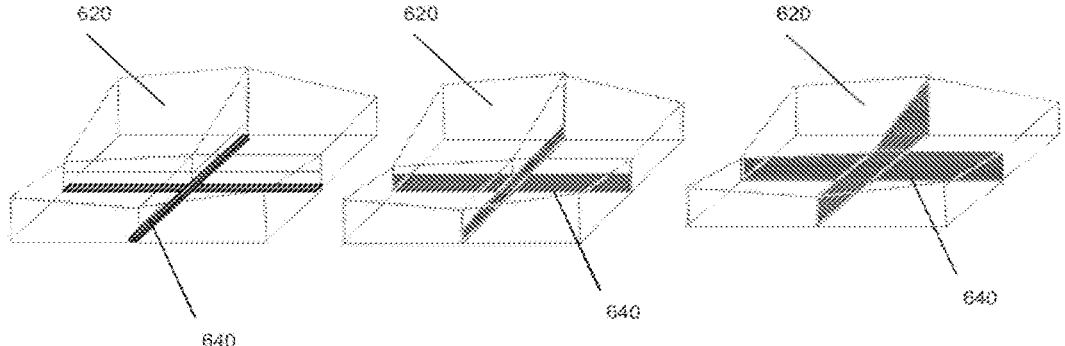
FIG. 10 is a schematic structural diagram of adding a shielding device at a junction of microprism blocks.

As shown in FIG. 10, light crosstalk among different microprism blocks can be reduced by adding a shielding device 640 at the junction of the microprism blocks. The shielding device 640 may be a separate device located above or below the viewing angle regulator, or is integrated (embedded) in the viewing angle regulator.

Figure 11:
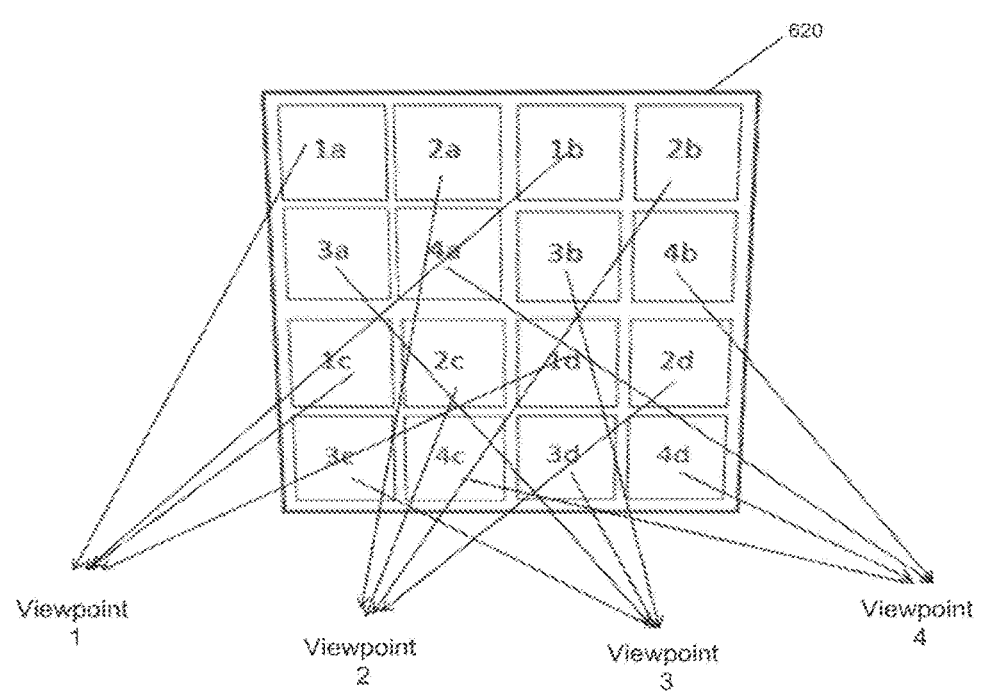
FIG. 11 is a schematic diagram of an example of each group of microprism blocks of an array of microprism blocks in the naked-eye 3D display device according to the present invention.

In order to further understand the operating principle of the microprism block array, FIG. 11 schematically shows a structure example of each group of microprism blocks in a naked-eye 3D display device according to the present invention. As shown in FIG. 11, an array of microprism blocks is divided into four groups. The first group is respectively marked as 1a, 1b, 1c, and 1d. The first group converges lights to obtain a viewpoint 1. At the viewpoint 1, an observer can view a first parallax image composed of the microprism blocks 1a, 1b, 1c, and 1d lit by the corresponding display unit group. The second group is respectively marked as 2a, 2b, 2c, and 2d. The second group converges the lights to obtain a viewpoint 2. At the viewpoint 2, the observer can view a second parallax image composed of the microprism blocks 2a, 2b, 2c, and 2d lit by the corresponding display unit group. The third group is respectively marked as 3a, 3b, 3c, and 3d. The third group converges the lights to obtain a viewpoint 3. At the viewpoint 3, the observer can view a third parallax image composed of the microprism blocks 3*a*, 3*b*, 3*c*, and 3*d* lit by the corresponding display unit group. The fourth group is respectively marked as 4*a*, 4*b*, 4*c*, and 4*d*. The fourth group converges the lights to obtain a viewpoint 4. At the viewpoint 4, the observer can view a fourth parallax image composed of the microprism blocks 4*a*, 4*b*, 4*c*, and 4*d* lit by the corresponding display unit group. It may be learned that the microprism blocks in each group are also arranged in an array. That is to say, the microprism blocks in each group are arranged in at least two rows and at least two columns. Due to different positions of the microprism blocks in each group, but the outgoing lights need to converge into a viewpoint, the outgoing lights of the microprism blocks in each group are all in different directions. Each row of microprism blocks in the microprism block array are divided into at least two different groups, and each column of microprism blocks in the microprism block array are divided into at least two different groups.

Figure 12:
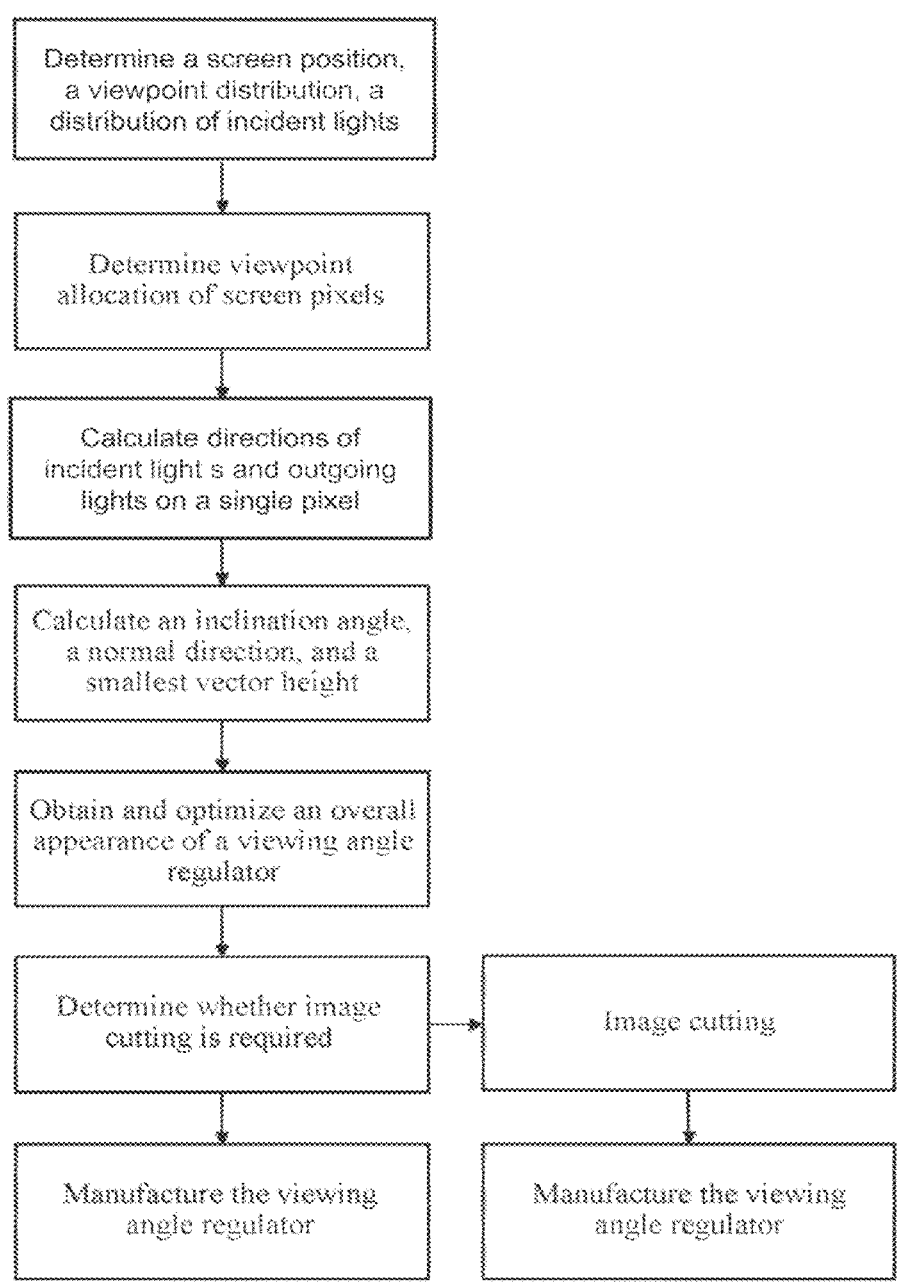
FIG. 12 shows a design flow of a viewing angle regulator.

The design process of the viewing angle regulator 620 is described below. FIG. 12 shows a design flow of a viewing angle regulator.

With reference to FIG. 6 and FIG. 12, in a 3D display design, a screen position, a viewpoint distribution (comprising a quantity of viewpoints, a viewpoint interval, a visual range, and the like), and a distribution of incident lights are generally determined first according to an application requirement. As shown in FIG. 6, the incident lights are parallel, and as shown in FIG. 9, the lights are incident from a point light source. Then, a viewpoint allocation method for screen pixels is determined according to a pixel size and an arrangement mode of the display screen, that is, which pixels are divided into one group and which viewpoint corresponds to each group of pixels. Therefore, a relative position relationship between the display and the viewpoint distribution is determined. Then, directions and positions of the incident lights and the outgoing lights of the screen pixels are calculated one by one. The direction of the outgoing light of the screen pixel herein means the outgoing angle of the outgoing light of the microprism block corresponding to the display unit. Based on the direction of the incident lights and the outgoing angle of the outgoing lights, the normal direction, the inclination angle, and the vector height of the inclined surface of the microprism block on the pixel corresponding to the viewing angle regulator may be calculated according to the Snell's (refraction) law. The inclined surface defined by the normal direction and the inclination angle herein is consistent with the inclined surface defined by the first angle and the second angle, but different parameters are adopted and the physical is meaning is the same. Morphology parameters of the viewing angle regulator are obtained accordingly. Finally, it is determined according to an actual processing requirement whether to cut the inclined surface to finally realize manufacturing and processing of the viewing angle regulator.

Figure 13:
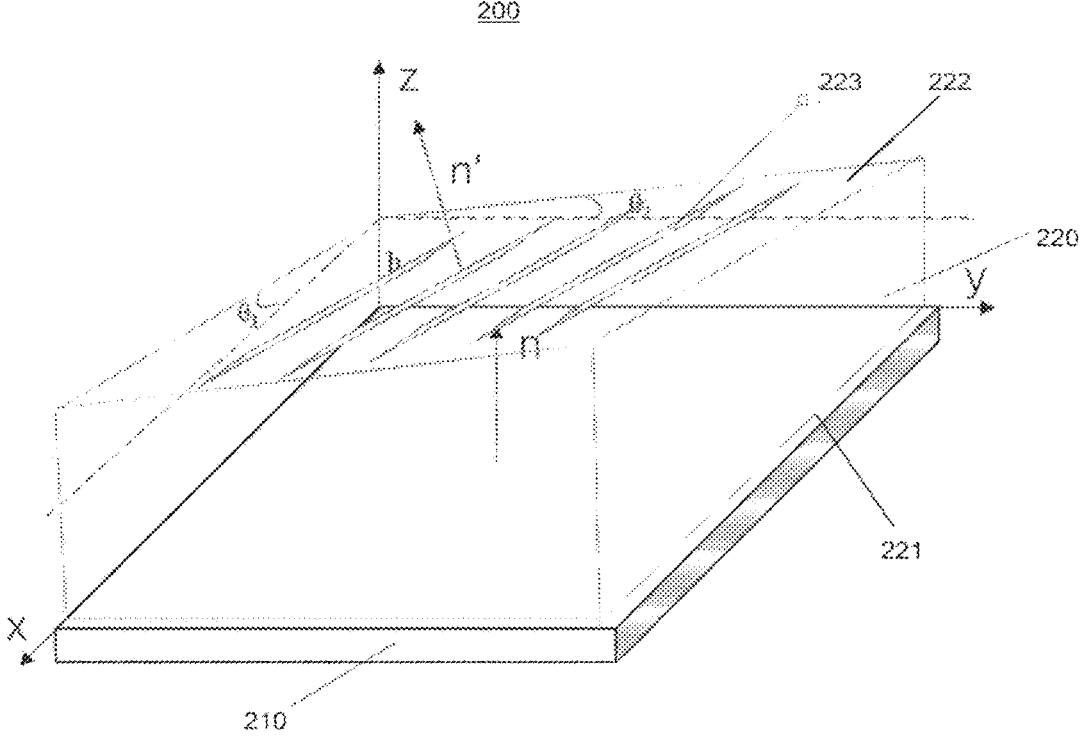
FIG. 13 is a schematic diagram of a stereostructure of a display assembly according to another embodiment of the present invention.

FIG. 13 is a schematic diagram of a stereostructure of a display assembly according to another embodiment of the present invention. As shown in FIG. 13, the display assembly 200 comprises a display unit 210 and a microprism block 220. The microprism block 220 comprises a first surface 221 close to the display unit 210 and a second surface 222 away from the display unit 210. A light n from the display unit 210 enters the microprism block 220 through the first surface 221, and then is emitted from the microprism block 120 through the second surface 222. A first angle $\theta_1$ is formed between the second surface 222 and the first surface 221 in a first direction x, and a second angle $\theta_2$ is formed between the second surface and the first surface in a second direction y perpendicular to the first direction x. An outgoing angle of the light emitted from the second surface is related to the first angle $\theta_1$ and the second angle $\theta_2$. Specifically, the first angle and the second angle of the microprism block are set as a predetermined angle combination, so that the light emitted from the microprism block has a predetermined outgoing angle.

The structure of the display assembly 200 in FIG. 13 is substantially the same as the structure of the display assembly 100 in FIG. 1. A difference between the display assembly 200 in FIG. 13 and the display assembly 100 in FIG. 1 is that the display assembly 200 further comprises a grating structure arranged on the second surface 222. A preset color can be seen at a specific angle through unique angle selectivity and wavelength selectivity of grating.

Figure 14:
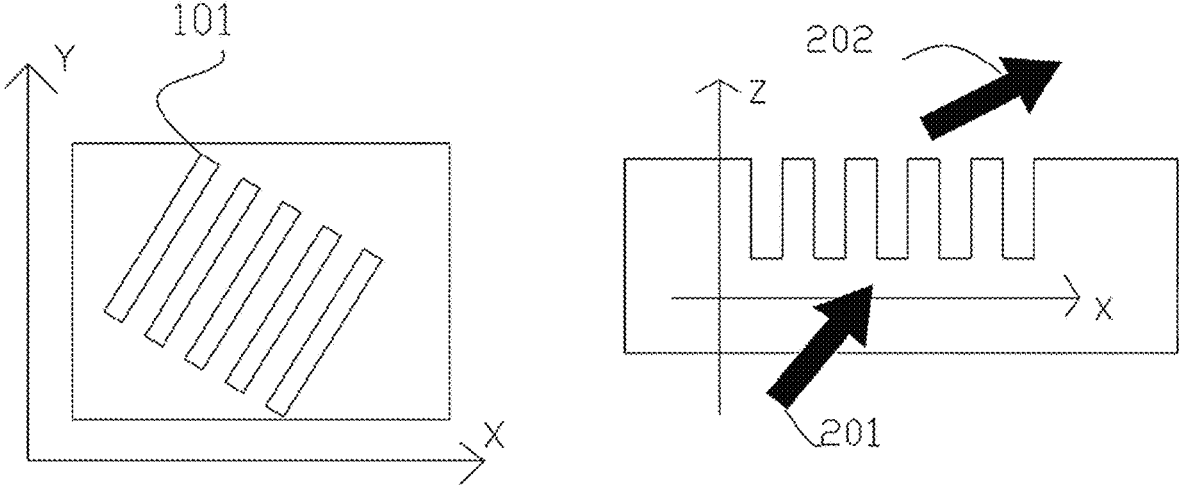
FIG. 14 is a schematic diagram of a lighting effect of a grating structure.

For the principle of the grating structure, reference is made to FIG. 14, which is a structure diagram of structure scales in a nano-level diffraction grating on a is plane XY and a plane XZ. According to a grating equation, a period and an orientation angle of a diffraction grating pixel 101 satisfy the following relationships:

$$\tan \phi_1 = \sin \phi / (\cos \phi - n \sin \theta(\Lambda/\lambda)) \tag{1}$$

$$\sin^2(\theta_1) = (\lambda/\Lambda)^2 + (n \sin \theta)^2 - 2n \sin \theta \cos(\lambda/\Lambda). \tag{2}$$

The light is incident on the plane XY at a certain angle. $\theta_1$ and $\phi_1$ respectively represent a diffraction angle (an angle between a diffraction ray and a positive direction of the z-axis) and an azimuth angle (an angle between the diffraction ray and a positive direction of the x-axis) of diffracted light 202. $\theta$ and $\lambda$ respectively represent an incident angle (an angle between the incident light and the positive direction of the z-axis) and a wavelength of a light source 201. $\Lambda$ and $\phi$ respectively represent a period and an orientation angle (an angle between a groove direction and a positive direction of the y-axis) of the nanometer diffraction grating 101. n represents a refractive index of a light wave in a medium. In other words, the period and the orientation angle of the nano-grating required may be calculated by using the above two equations after the wavelength and the incident angle of the incident light and the diffraction angle and the diffraction azimuth angle of the diffracted light are specified. For example, red light of a 650 nm wavelength is incident at an angle of 60°, a diffraction angle of the light is 10°, and a diffraction azimuth angle is 45°. Through calculation, the corresponding nanometer diffraction grating has a period of 550 nm and an orientation angle of −5.96°. In this way, by designing the prism structure and the period and the orientation angle of the grating structure, a matching color can be expressed at a desired viewpoint position. Requirement of the prism inclination or the grating period for machining accuracy can be reduced. In addition, the diffraction efficiency of the grating at a specific observation position may be further changed by changing information such as the groove depth and the duty cycle of the grating, so that brightness information can be expressed. The pixelated prism structure is made of a transparent material, and the ambient light is refracted and reflected after reaching the prism structure. In this case, the light has weak wavelength selectivity. After the light passes through the designed pixelated prism structure and passes through the grating on the inclined surface, a colorful 3D image is presented in human eyes.

In addition, it should be noted that the display assembly may be displayed in color if the display unit 210 is a light-emitting pixel and light emitted by the light-emitting pixel is colored, even if no grating structure is arranged on the second surface. Certainly, if a grating structure is additionally designed, the color of the light emitted by the display unit 210 may be further changed to improve the light effect.

Terms such as "comprise", "include" or any other variants herein are intended to encompass non-exclusive inclusion, in addition to those elements listed, but also other elements not explicitly listed.

Orientation terms such as "front", "back", "up", and "down" involved herein are defined by positions of parts in the accompanying drawings and between the parts, just for the clarity and convenience of expression of the technical solution. It should be understood that the use of the orientation terms should not limit the protection scope of this application.

The above embodiments herein and features in the embodiments may be combined with each other in a case that no conflict occurs.

The above are only preferred embodiments of the present invention and to are not intended to limit the present invention. Any modification, equivalent replacement, or improvement made within the spirit and principle of the present invention shall be included in the protection scope of the present invention.

What is claimed is:

1. A naked-eye 3D display device, comprising:

a display component;

a viewing angle regulator comprising an array of microprism blocks, each of the microprism blocks comprising a first surface close to the display component and a second surface away from the display component, a light from the display component entering the microprism block through the first surface of the microprism block, and then being emitted from the microprism block through the second surface of the microprism block, the second surface of the microprism block forming a first angle with the first surface in a first direction, the second surface of the microprism block forming a second angle with the first surface in a second direction perpendicular to the first direction, an outgoing angle of the light emitted from the second surface of the microprism block being related to the first angle and the second angle;

wherein the array of microprism blocks are divided into a plurality of groups, and an angle combination of the first angle and the second angle of each of the microprism blocks is preset so that the lights emitted from the same group of microprism blocks converge into the same viewpoint, and the lights emitted from different groups of microprism blocks converge into different viewpoints;

wherein the plurality of groups comprises at least three groups;

wherein the microprism blocks belonging to the same group are scattered at different positions, and the microprism blocks belonging to the different groups are staggered; and wherein the first angle and the second angle each range from 1 to 30 degrees.

2. The naked-eye 3D display device according to claim 1, wherein the display component comprises an array of display units, the array of display units is configured to simultaneously display a plurality of images with different viewing angles, the display units corresponding to each group of microprism blocks displays the image of one viewing angle, and the display units corresponding to different groups of microprism blocks display the images of different viewing angles.

3. The naked-eye 3D display device according to claim 2, further comprising an aperture array diaphragm located between the display component and the viewing angle regulator, wherein the aperture array diaphragm comprises an array of apertures, each of the apertures corresponds to one of the display units, and a light emitted from the display unit is propagated to the corresponding microprism block through the corresponding aperture.

4. The naked-eye 3D display device according to claim 3, wherein a diameter of a side of the aperture facing the display unit is less than a diameter of a side of the aperture facing the microprism block; and the aperture is in the shape of a round column, a square column, or a polygonal column.

5. The naked-eye 3D display device according to claim 1, wherein the first surface of the microprism block is a plane, the second surface of the microprism block is an inclined surface relative to the first surface, and the first surfaces of the microprism blocks are coplanar; or the second surface of the microprism block is a plane, the first surface is an inclined surface relative to the second surface, and the second surfaces of the microprism blocks are coplanar.

6. The naked-eye 3D display device according to claim 1, wherein the microprism block controls the outgoing angle of the light emitted from the second surface through a refraction principle;

N times a wavelength of the outgoing light is less than a side length of the microprism block, wherein N is greater than or equal to 2; and the microprism blocks belonging to the same group are scattered at different positions, and the microprism blocks belonging to the different groups are staggered.

7. The naked-eye 3D display device according to claim 1, wherein the display unit comprises one or more light-emitting pixels, wherein the light-emitting pixels are LED pixels or LCD pixels, or one or more reflective pixels.

8. The naked-eye 3D display device according to claim 1, wherein the display component is a point light source.

9. The naked-eye 3D display device according to claim 1, further comprising:

a shielding device arranged at a junction of the microprism blocks, wherein the shielding device is a separate device located above or below the viewing angle regulator, or is integrated on the viewing angle regulator.

10. The naked-eye 3D display device according to claim 1, wherein the first angle and the second angle of each of the microprism blocks are set as a predetermined angle combination, so that the light emitted from each of the microprism blocks has a predetermined outgoing angle, the lights emitted from the microprism blocks in the same group converge into the same viewpoint, and the lights emitted from the microprism blocks in different groups converge into different viewpoints.

11. The naked-eye 3D display device according to claim 1, wherein a grating structure is provided on the second surface of each of the microprism blocks.

12. The naked-eye 3D display device according to claim 1, wherein the microprism blocks in each group are arranged in at least two rows and at least two columns, and since the microprism blocks in each group are in different positions, the directions of outgoing lights from the microprism blocks in each group are different, so as to converge the outgoing lights to one viewpoint.

* * * * *